(12) United States Patent
Li et al.

(10) Patent No.: US 11,774,690 B2
(45) Date of Patent: Oct. 3, 2023

(54) CONNECTOR HAVING OPTICAL FIBER CONNECTION MECHANISM AND CONNECTOR ASSEMBLY THEREOF

(71) Applicant: Delta Electronics, Inc., Taoyuan (TW)

(72) Inventors: Sheng-Hua Li, Taoyuan (TW); Chun-Han Lin, Taoyuan (TW); Wen-Lung Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 72 days.

(21) Appl. No.: 17/451,532

(22) Filed: Oct. 20, 2021

(65) Prior Publication Data

US 2023/0043969 A1 Feb. 9, 2023

(30) Foreign Application Priority Data

Aug. 4, 2021 (CN) .......................... 202110889132.4

(51) Int. Cl.
*G02B 6/42* (2006.01)

(52) U.S. Cl.
CPC .......... *G02B 6/4245* (2013.01); *G02B 6/428* (2013.01); *G02B 6/4231* (2013.01); *G02B 6/4257* (2013.01)

(58) Field of Classification Search
CPC .. G02B 6/4245; G02B 6/4231; G02B 6/4257; G02B 6/428
USPC ......................................................... 385/14
See application file for complete search history.

(56) References Cited

U.S. PATENT DOCUMENTS

| | | | |
|---|---|---|---|
| 8,632,651 B1 | 1/2014 | Hicks et al. | |
| 10,139,569 B2 | 11/2018 | Sipes, Jr. et al. | |
| 10,768,374 B2 | 9/2020 | Gurreri et al. | |
| 2005/0282441 A1 | 12/2005 | Murr et al. | |
| 2015/0378118 A1* | 12/2015 | Huegerich | G02B 6/3817 385/89 |

FOREIGN PATENT DOCUMENTS

| | | |
|---|---|---|
| CN | 202712644 U | 1/2013 |
| CN | 204885741 U | 12/2015 |
| CN | 107592161 A | 1/2018 |
| CN | 211505959 U | 9/2020 |
| JP | 2002334741 A | 11/2002 |
| JP | 2004077715 A | 3/2004 |
| TW | 201214875 A | 4/2012 |
| TW | I578048 B | 4/2017 |

* cited by examiner

*Primary Examiner* — Jerry M Blevins
(74) *Attorney, Agent, or Firm* — KIRTON McCONKIE; Evan R. Witt (57) ABSTRACT

A connector for a system circuit board or a power module is provided. The connector includes a main body and an optical connection mechanism. The main body includes a first connecting terminal and a second connecting terminal. The first connecting terminal and the second connecting terminal are power contacts or signal contacts. The optical fiber connection mechanism is embedded within the main body. The optical fiber connection mechanism is disposed between the first connecting terminal and the second connecting terminal. Since the optical fiber connection mechanism is embedded within the main body, it is not necessary to specifically remove the optical fiber cable when the power module is detached from the cabinet. Moreover, the appearance of the product is more aesthetically-pleasing, and the maintaining speed and the product reliability are increased.

11 Claims, 7 Drawing Sheets

FIG. 7

CONNECTOR HAVING OPTICAL FIBER CONNECTION MECHANISM AND CONNECTOR ASSEMBLY THEREOF

CROSS-REFERENCE TO RELATED APPLICATION

This application claims priority to China Patent Application No. 202110889132.4, filed on Aug. 4, 2021. The entire contents of the above-mentioned patent application are incorporated herein by reference for all purposes.

FIELD OF THE INVENTION

The present disclosure relates to a connector and a connector assembly, and more particularly to a connector having an optical fiber connecting mechanism and a connector assembly with two connectors.

BACKGROUND OF THE INVENTION

Optical fiber communication is a technology of using light and optical fiber to transmit information. That is, the optical fiber communication technology is a wired communication technology. After the light is modulated, the light can carry information. As known, the optical fiber communication has the advantages of large transmission capacity and good confidentiality. Consequently, the optical fiber communication has gradually become the mainstream wired communication method in recent years and also plays an extremely important role in the industry.

With the advancement of computer technologies and the rapid development of the Internet, the demand for electricity has also risen increasingly. In order to provide sufficient electric power, a plurality of power modules are usually configured in the power system cabinet, and most of them are medium voltage power modules. Since the system control area of the central controller is a low-voltage area, the transmission of signals in the medium-voltage areas and the low-voltage areas are restricted by safety regulations. Therefore, it is a common practice in the industry to transmit some signals through optical fiber communication in order to avoid the generation of related security problems.

Figure 1:
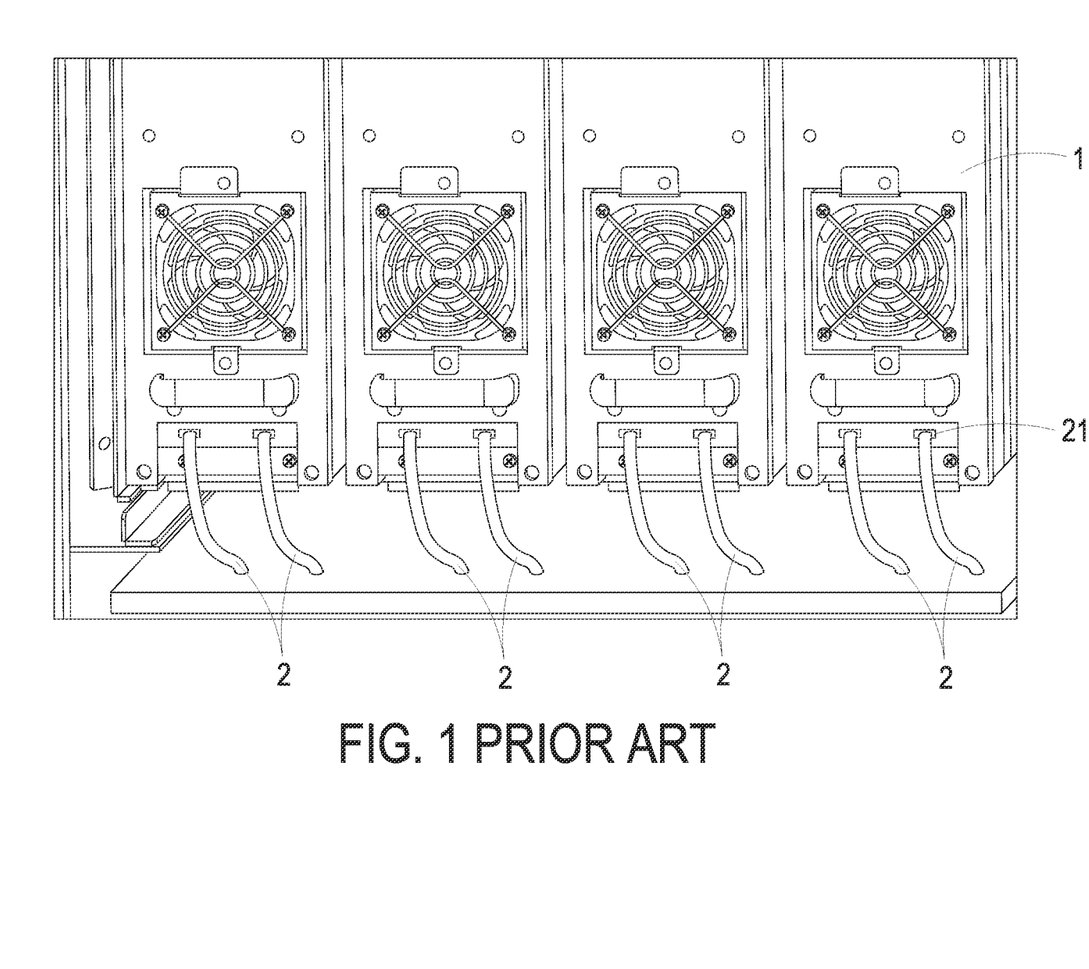
FIG. 1 schematically illustrates the connection between a conventional medium voltage power module and an optical fiber cable.

However, the conventional method of connecting the medium voltage power module and the optical fiber cable still has some drawbacks. FIG. 1 schematically illustrates the connection between a conventional medium voltage power module and an optical fiber cable. After the medium voltage power module 1 is installed in the cabinet, the optical fiber cable 2 is connected with the medium voltage power module 1 at the front side of the cabinet through an optical fiber connector 21. During the process of maintaining the medium voltage power module 1, the optical fiber connector 21 and the optical fiber cable 2 need to be manually removed from the front side of the conventional medium voltage power module 1. Moreover, the plurality of corresponding optical fiber cables 2 need to be removed sequentially and placed properly. In other words, this maintaining process is time-consuming and labor-intensive. Moreover, if the optical fiber cable 2 is not removed or the optical fiber cable 2 is not placed properly, some other problems occur. For example, during the process of plugging or removing the conventional medium voltage power module 1, the optical fiber cable 2 is readily damaged. In other words, the maintenance cost is increased.

Therefore, there is a need of providing an improved connector and an improved connector assembly in order to overcome the drawbacks of the conventional technologies.

SUMMARY OF THE INVENTION

An object of the present disclosure provides a connector with an optical fiber connection mechanism and a connector assembly. The optical fiber connection mechanism is embedded within a main body of the connector that is connected to a power module and a system circuit board. Consequently, when a power module is detached from the cabinet for maintenance, the main body and the optical fiber connection mechanism are detached from the power module simultaneously. Moreover, since the optical fiber connection mechanism is integrated into the connector, the appearance of the product is more aesthetically-pleasing, and the maintaining speed and the product reliability are increased.

Another object of the present disclosure provides a connector with an optical fiber connection mechanism and a connector assembly. The connector assembly includes a first connector and a second connector. During the process of maintaining a power module from the front side of a cabinet, it is not necessary to remove the optical fiber cable. That is, the power module can be removed directly. Consequently, the maintaining speed is effectively increased, and the possibility of causing damage of the optical fiber cable is minimized. Moreover, the first connector and the second connector are equipped with guiding parts. The guiding parts can guide the docking connection between the first connector and the second connector and assist in positioning the first connector and the second connector.

In accordance with an aspect of present disclosure, a connector for a system circuit board and a power module is provided. The connector includes a main body and an optical connection mechanism. The main body includes a first connecting terminal and a second connecting terminal. The first connecting terminal and the second connecting terminal are power contacts or signal contacts. The optical fiber connection mechanism is embedded within the main body. The optical fiber connection mechanism is disposed between the first connecting terminal and the second connecting terminal.

In accordance with another aspect of present disclosure, a connector assembly for a system circuit board and a power module is provided. The connector assembly includes a first connector and a second connector. The first connector includes a first main body and a first optical fiber connection mechanism. The first main body includes a first connecting terminal and a second connecting terminal. The first optical fiber connection mechanism is embedded within the first main body and disposed between the first connecting terminal and the second connecting terminal. The second connector includes a second main body and a second optical fiber connection mechanism. The second main body includes a third connecting terminal and a fourth connecting terminal. The second optical fiber connection mechanism is embedded within the second main body and disposed between the third connecting terminal and the fourth connecting terminal. When the first connector and the second connector are connected with each other, the third connecting terminal is connected with the first connecting terminal, the fourth connecting terminal is connected with the second connecting terminal, and the first optical fiber connection mechanism and the second optical fiber connection mechanism are docked with each other.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

In order to address the issues caused by the need to detach the optical fiber cable during the maintenance of the conventional power module, an optical fiber connection mechanism of the connector of the present disclosure is integrated and embedded in the main body of the connector which is used for connecting the power module and the system circuit board. That is, the optical fiber connection mechanism is added to the connector that is originally used for connecting the power module and the system circuit board when installing the power module in the cabinet and making the power module connected to the system circuit board. Accordingly, when the power module is installed in the cabinet, the optical fiber cables can be connected at the same time, and when the power module is detached from the cabinet for maintenance, the optical fiber cables are disconnected simultaneously. Consequently, the maintaining speed and the product reliability are effectively increased.

Figure 2:
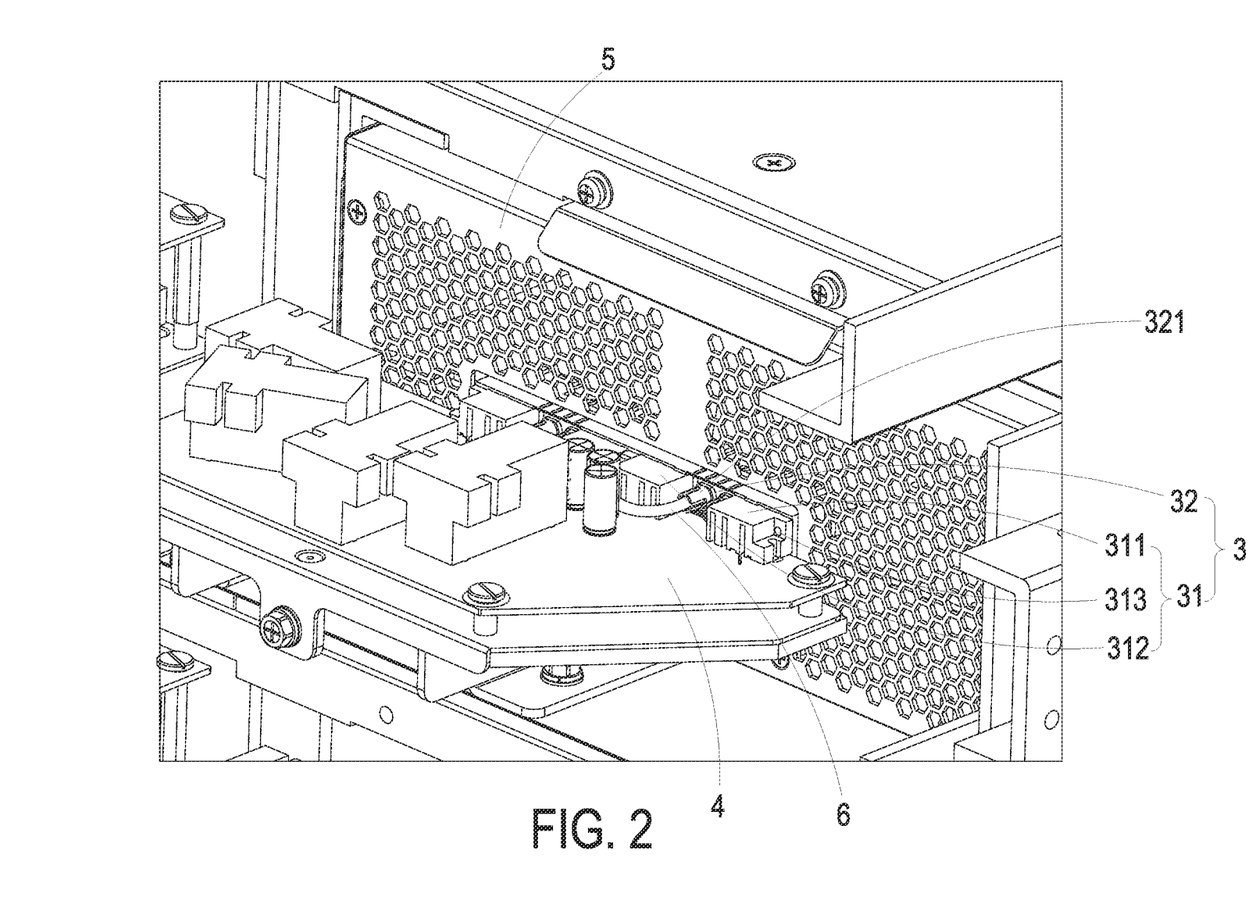
FIG. 2 is a schematic perspective view illustrating a connector with an optical fiber connection mechanism according to an embodiment of the present disclosure.

FIG. 2 is a schematic perspective view illustrating a connector with an optical fiber connection mechanism according to an embodiment of the present disclosure. The connector 3 is disposed in a cabinet (not shown). The connector 3 is used for connecting a system circuit board 4 and a power module 5, and can be connected with a system circuit board 4 or a power module 5. The connector 3 includes a main body 31 and an optical fiber connection mechanism 32. The main body 31 is located at the junction between a back side of the power module 5 and the system circuit board 4. The main body 31 includes a first connecting terminal 311 and a second connecting terminal 312. The first connecting terminal 311 is a power contact or a signal contact. The second connecting terminal 312 is a power contact or a signal contact. In an embodiment, the first connecting terminal 311 is a power contact and the second connecting terminal 312 is a signal contact, or the first connecting terminal 311 is a signal contact and the second connecting terminal 312 is a power contact. The power contact is used to transfer low voltage power. The signal contact is used to transfer electrical signals. The optical fiber connection mechanism 32 is embedded within the main body 31. In addition, the optical fiber connection mechanism 32 is disposed between the first connecting terminal 311 and the second connecting terminal 312. As mentioned above, the optical fiber connection mechanism 32 is embedded within the main body 31 of the connector 3. Consequently, when the power module 5 is detached from the cabinet for maintenance, the main body 31 and the optical fiber connection mechanism 32 are detached from the power module 5 at the same time. Moreover, since the optical fiber connection mechanism 32 is integrated into the connector 3, the appearance of the product is more aesthetically-pleasing, and the maintaining speed and the product reliability are increased.

In accordance with the present disclosure, the main body 31 of the connector 3 can be connected with the system circuit board 4 or the power module 5. In case that the main body 31 of the connector 3 is connected with the system circuit board 4, the connector 3 is used as a system side connector. In case that the main body 31 of the connector 3 is connected with the power module 5, the connector 3 is used as a module side connector. In addition, the main body 31 of the connector 3 further includes a guiding part 313. The guiding part 313 and the optical fiber connection mechanism 32 are located beside two opposite sides of the first connecting terminal 311, respectively. In an embodiment, the optical fiber connection mechanism 32 includes at least one optical fiber terminal 321. The optical fiber terminal 321 is protruded from the main body 31 of the connector 3. Moreover, an optical fiber cable 6 is fixed in the optical fiber terminal 321. In some embodiments, the optical fiber connection mechanism 32 may include a plurality of optical fiber terminals 321, and the plurality of optical fiber cables 6 are fixed in the corresponding optical fiber terminals 321. It is noted that the number of the optical fiber terminals 321 and the number of the optical fiber cables 6 may be varied according to the practical requirements. For example, in an embodiment, the optical fiber connection mechanism 32 includes two optical fiber terminals 321, and two optical fiber cables 6 are respectively fixed in the two optical fiber terminals 321.

In an embodiment, the system side connector and the module side connector include matching guiding parts, e.g., convex structures and concave structures. During the process of installing the power module, the matching guiding parts guide the docking connection between the corresponding connectors of the system circuit board and the power module and assisting in positioning the connectors. When the system side connector and the module side connector are connected with each other, the corresponding power contacts are connected with each other to transfer the low voltage power, the corresponding signal contacts are connected with each other to transfer the electrical signals, and the corresponding optical fiber terminals are connected with each other to transfer the optical signals.

In the above embodiment, the connector 3 is disposed in a cabinet, and the connector 3 is located at the junction between the back side of the power module 5 and the system circuit board 4. In an implementation example, two connectors 3 are disposed on the surface of the system circuit board 4 and the back side of the power module 5, respectively. In addition, the two connectors 3 are respectively used as the system side connector and the module side connector. The process of installing the power module 5 into the cabinet is simple. For example, after the power module 5 is inserted into the cabinet from the outside, the connector 3 on the back side of the power module 5 and the connector 3 on the surface of the system circuit board 4 are connected with each other and well positioned through the guidance of the guiding parts 313. Moreover, during the process of maintaining the power module 5 from the front side of the cabinet, it is not necessary to specifically remove the optical fiber cable 6. That is, the power module 5 can be removed directly. Consequently, the maintaining speed is effectively increased, and the possibility of causing damage of the optical fiber cable 6 is minimized.

Figure 3:
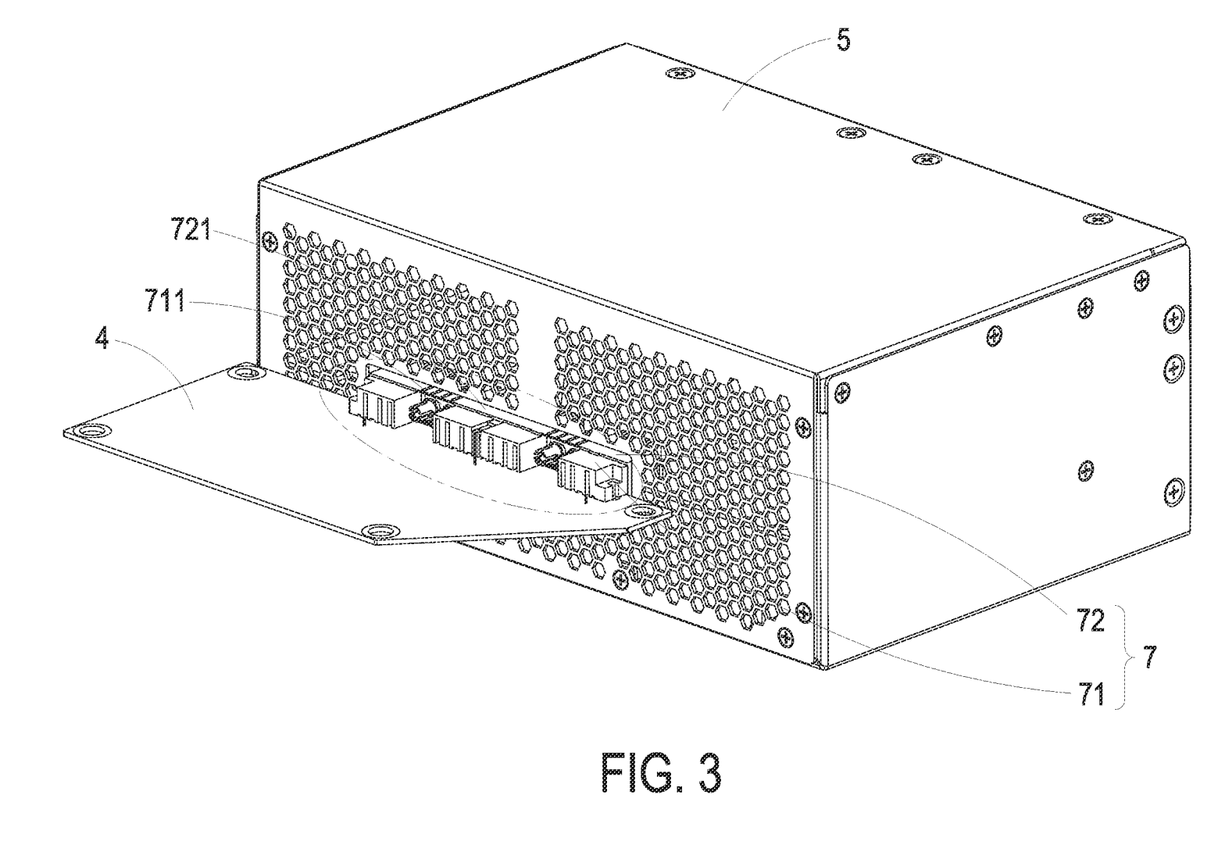
FIG. 3 is a schematic perspective view illustrating a connector assembly disposed on a system circuit board and a power module according to an embodiment of the present disclosure.

FIG. 3 is a schematic perspective view illustrating a connector assembly disposed on a system circuit board and a power module according to an embodiment of the present disclosure. The connector assembly 7 is connected with the system circuit board 4 and the power module 5. In an embodiment, the connector assembly 7 includes a first connector 71 and a second connector 72. The first connector 71 is a system side connector. A first main body 711 of the first connector 71 is connected with the system circuit board 4. The second connector 72 is a module side connector. A second main body 721 of the second connector 72 is connected with the power module 5.

The detailed structure of the connector assembly 7 will be illustrated in more detailed as follows.

Figure 4:
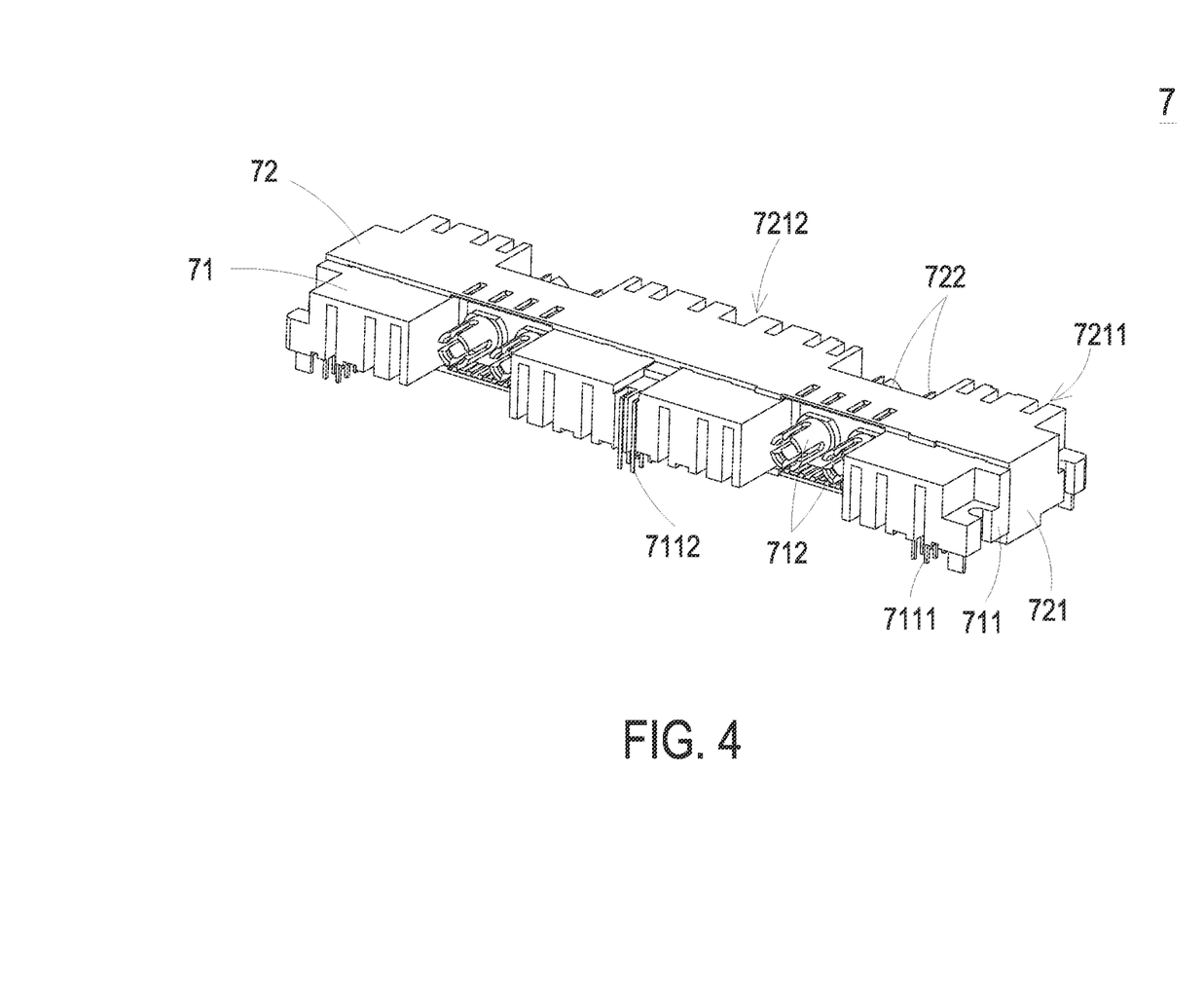
FIG. 4 is a schematic perspective view illustrating the connector assembly as shown in FIG. 3.
Figure 5:
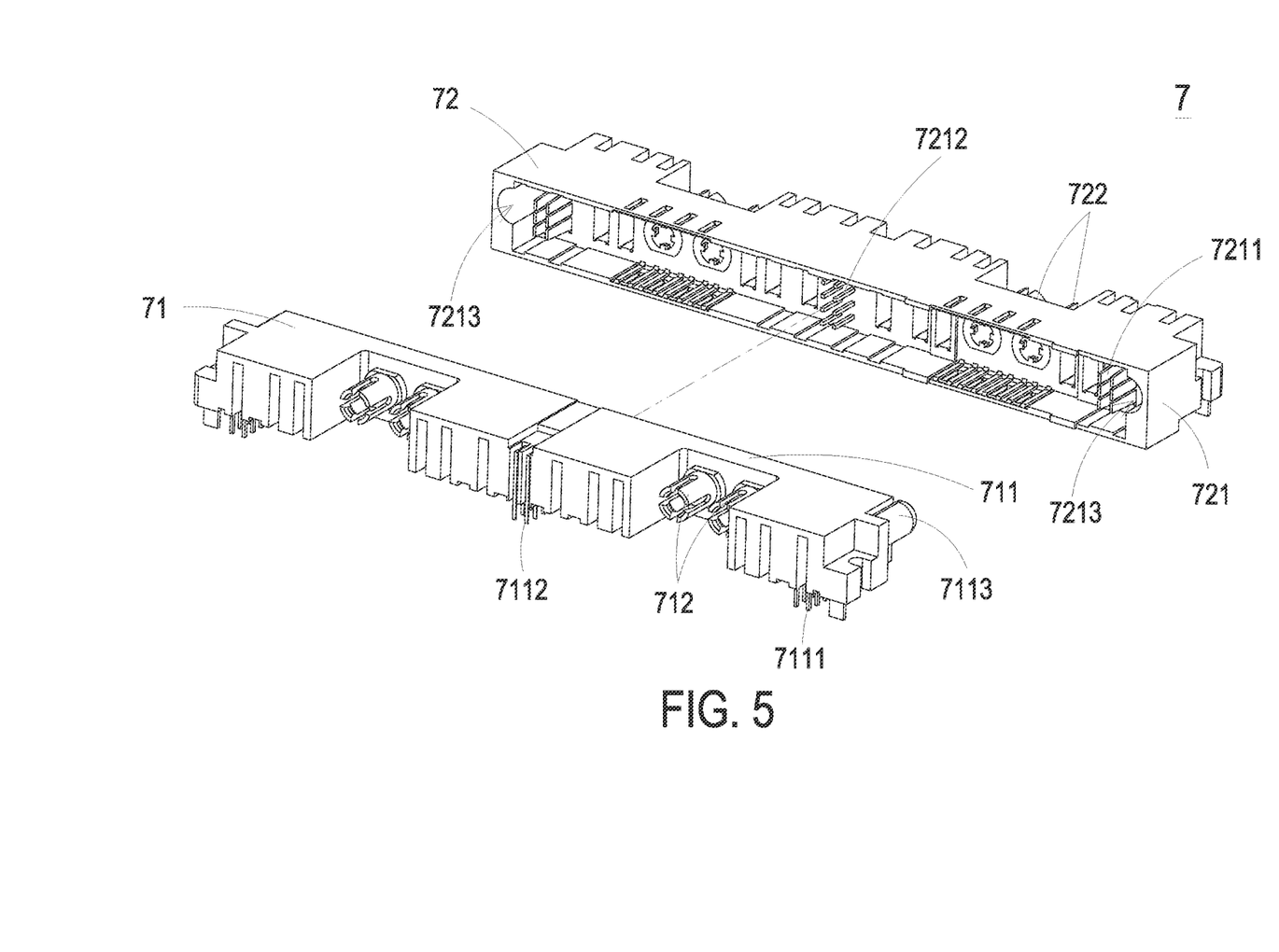
FIG. 5 is a schematic exploded view illustrating the connector assembly as shown in FIG. 4 and taken along a viewpoint.
Figure 6:
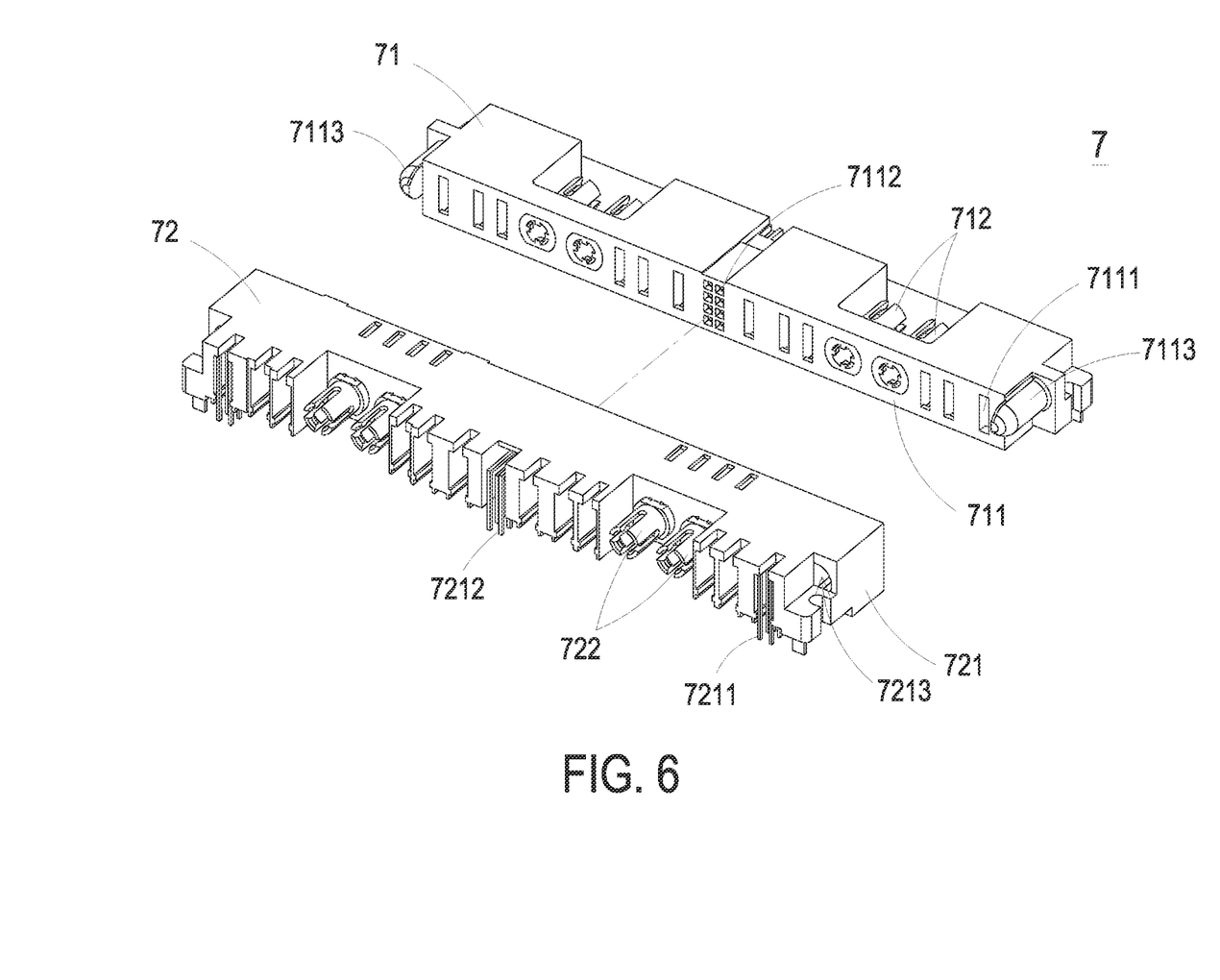
FIG. 6 is a schematic exploded view illustrating the connector assembly as shown in FIG. 4 and taken along another viewpoint.
Figure 7:
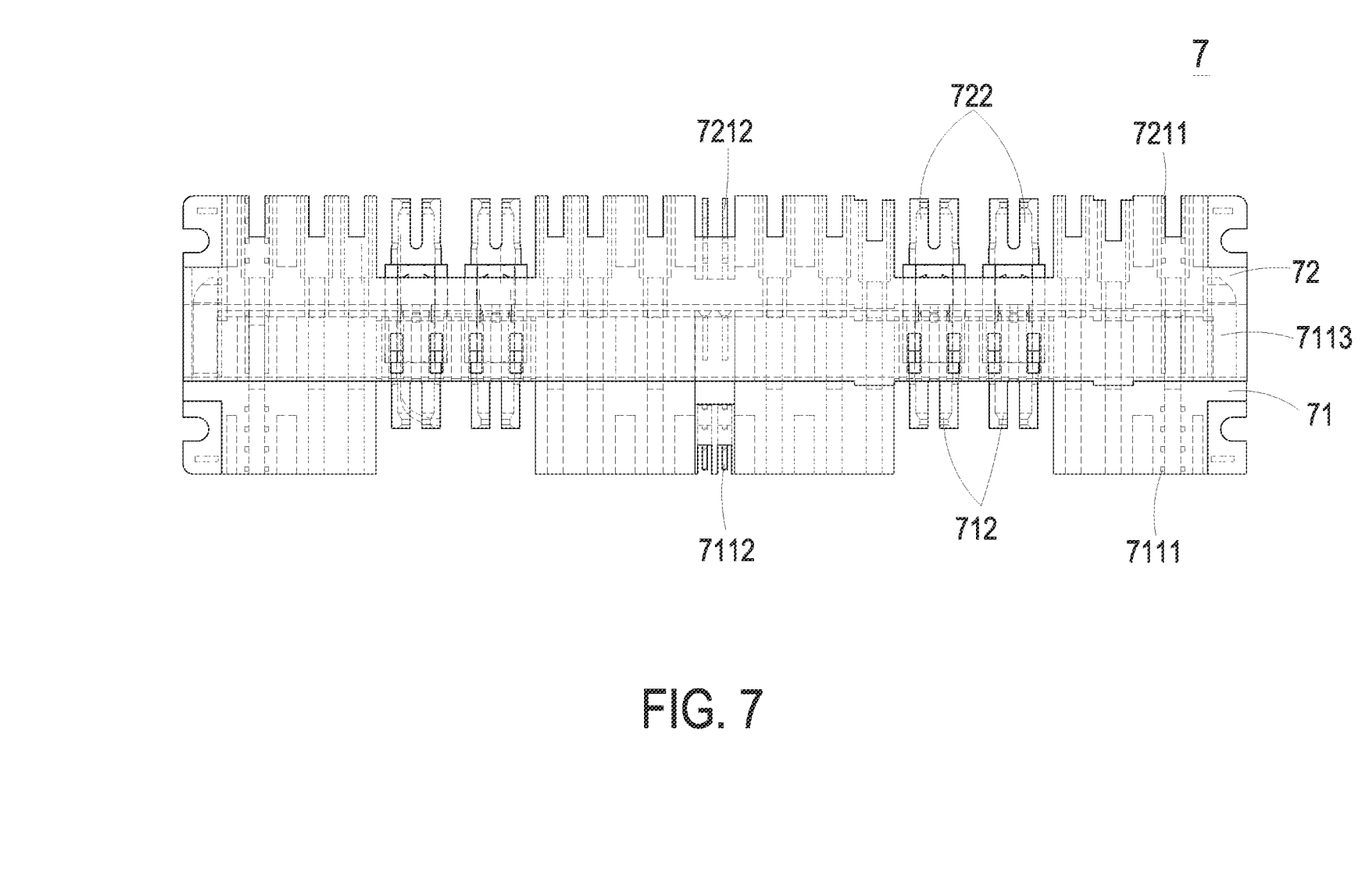
FIG. 7 is a schematic top view illustrating the connector assembly as shown in FIG. 4.

Please refer FIGS. 4, 5, 6 and 7. FIG. 4 is a schematic perspective view illustrating the connector assembly as shown in FIG. 3. FIG. 5 is a schematic exploded view illustrating the connector assembly as shown in FIG. 4 and taken along a viewpoint. FIG. 6 is a schematic exploded view illustrating the connector assembly as shown in FIG. 4 and taken along another viewpoint. FIG. 7 is a schematic top view illustrating the connector assembly as shown in FIG. 4. The connector assembly 7 in the present disclosure includes the first connector 71 and the second connector 72. The first connector 71 includes the first main body 711 and a first optical fiber connection mechanism 712. The first main body 711 includes a first connecting terminal 7111 and a second connecting terminal 7112. The first optical fiber connection mechanism 712 is embedded within the first main body 711. In addition, the first optical fiber connection mechanism 712 is disposed between the first connecting terminal 7111 and the second connecting terminal 7112. The second connector 72 includes the second main body 721 and a second optical fiber connection mechanism 722. The second main body 721 includes a third connecting terminal 7211 and a fourth connecting terminal 7212. The third connecting terminal 7211 is connected with the first connecting terminal 7111. The fourth connecting terminal 7212 is connected with the second connecting terminal 7112. The second optical fiber connection mechanism 722 is embedded within the second main body 721. In addition, the second optical fiber connection mechanism 722 is disposed between the third connecting terminal 7211 and the fourth connecting terminal 7212. When the first connector 71 and the second connector 72 are connected with each other, the first optical fiber connection mechanism 712 and the second optical fiber connection mechanism 722 are docked with each other. Consequently, a system side optical fiber cable connected with the first fiber connection mechanism 712 and a module side optical fiber cable connected with the second fiber connection mechanism 722 can be connected with each other to transfer the optical signals.

In an embodiment, the first connecting terminal 7111, the second connecting terminal 7112, the third connecting terminal 7211 and the fourth connecting terminal 7212 are power contacts or signal contacts. The power contacts are used to transfer the low voltage power, and the signal contacts are used to transfer the electrical signals.

In an embodiment, the first main body 711 of the first connector 71 includes a first guiding part 7113, and the second main body 721 of the second connector 72 includes a second guiding part 7213. The first guiding part 7113 and the second guiding part 7213 guide the docking connection between the first connector 71 and the second connector 72 and assist in positioning the first connector 71 and the second connector 72.

In an embodiment, the first guiding part 7113 of the first main body 711 in the first connector 71 of the connector assembly 7 is a protrusion structure. The protrusion structure is extended from the main body 711. In addition, the second guiding part 7213 of the second main body 721 in the second connector 72 of the connector assembly 7 is an accommodation structure. The accommodation structure is formed in the second main body 721. When the first connector 71 and the second connector 72 are docked with each other, the protrusion structure is accommodated within the accommodation structure. In other words, the protrusion structure and the accommodation structure guide the docking connection between the first connector 71 and the second connector 72 and assist in positioning the first connector 71 and the second connector 72. Consequently, the system circuit board 4 and the power module 5 are electrically connected with each other through the connector assembly 7. In an embodiment, the accommodation structure is a guiding channel.

In some embodiments, the first connector 71 includes plural sets of the first connecting terminals 7111 and plural sets of the second connecting terminals 7112, and the second connector 72 includes plural sets of the third connecting terminals 7211 and plural sets of the fourth connecting terminals 7212. Please refer to FIGS. 4, 5, 6 and 7 again. In this embodiment, two sets of the first connecting terminals 7111 and two sets of the second connecting terminals 7112 are disposed on the first main body 711 of the first connector 71, and two sets of the third connecting terminals 7211 and two sets of the fourth connecting terminals 7212 are disposed on the second main body 721 of the second connector 72. It is noted that the numbers of the first connecting terminals 7111, the second connecting terminals 7112, the third connecting terminals 7211 and the fourth connecting terminals 7212 may be varied according to practical requirements.

Optionally, after the power module 5 is installed in the cabinet and the first connector 71 and the second connector 72 are docked with each other, the power module 5 can be fixed in the cabinet through screws (not shown) in order to avoid the loosening of the power module 5. It is noted that the method of fixing the power module 5 is not restricted.

From the above descriptions, the present disclosure provides a connector with an optical fiber connection mechanism and a connector assembly. The optical fiber connection mechanism is embedded within the main body of the connector. Consequently, when the power module is detached from the cabinet for maintenance, the main body and the optical fiber connection mechanism are detached from the power module simultaneously. Moreover, since the optical fiber connection mechanism is integrated into the connector, the appearance of the product is more aesthetically-pleasing, and the maintaining speed and the product reliability are increased. Moreover, during the process of maintaining the power module from the front side of the cabinet, it is not necessary to specifically remove the optical fiber cable. That is, the power module can be removed directly. Consequently, the maintaining speed is effectively increased, and the possibility of causing damage of the optical fiber cable is minimized. Moreover, the guiding parts can guide the docking connection between the first connector and the second connector and assist in positioning the first connector and the second connector.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A connector for a system circuit board and a power module, the connector comprising:
    a main body comprising a first connecting terminal and a second connecting terminal, wherein the first connecting terminal is a power contact or a signal contact and the second connecting terminal is a power contact or a signal contact; and
    an optical fiber connection mechanism embedded within the main body, wherein the optical fiber connection mechanism is disposed between the first connecting terminal and the second connecting terminal,
    wherein the main body comprises a guiding part for guiding a docking connection between the system circuit board and the power module, and
    wherein the guiding part is a protrusion structure or an accommodation structure, and the guiding part and the optical fiber connection mechanism are located beside two opposite sides of the first connecting terminal, respectively.

2. The connector according to claim 1, wherein the main body is located at a junction between a back side of the power module and the system circuit board.

3. The connector according to claim 1, wherein the main body is connected with the system circuit board or the power module.

4. The connector according to claim 1, wherein low voltage power is transferred through the power contact, and electrical signals are transferred through the signal contact.

5. The connector according to claim 1, wherein the optical fiber connection mechanism comprises an optical fiber terminal, wherein the optical fiber terminal is protruded from the main body, and an optical fiber cable is fixed in the optical fiber terminal.

6. A connector assembly for a system circuit board and a power module, the connector assembly comprising:
    a first connector comprising a first main body and a first optical fiber connection mechanism, wherein the first main body comprises a first connecting terminal and a second connecting terminal, and the first optical fiber connection mechanism is embedded within the first main body and disposed between the first connecting terminal and the second connecting terminal; and
    a second connector comprising a second main body and a second optical fiber connection mechanism, wherein the second main body comprises a third connecting terminal and a fourth connecting terminal, and the second optical fiber connection mechanism is embedded within the second main body and disposed between the third connecting terminal and the fourth connecting terminal,
    wherein when the first connector and the second connector are connected with each other, the third connecting terminal is connected with the first connecting terminal, the fourth connecting terminal is connected with the second connecting terminal, and the first optical fiber connection mechanism and the second optical fiber connection mechanism are docked with each other.

7. The connector assembly according to claim 6, wherein the first connector is a system side connector, and the second connector is a module side connector.

8. The connector assembly according to claim 7, wherein the first main body of the first connector is connected with the system circuit board, and the second main body of the second connector is connected with the power module.

9. The connector assembly according to claim 6, wherein the first main body of the first connector comprises a first guiding part, and the second main body of the second connector comprises a second guiding part, wherein the first guiding part and the second guiding part guide a docking connection between the first connector and the second connector, so that the system circuit board and the power module are electrically connected with each other.

10. The connector assembly according to claim 9, wherein the first guiding part is a protrusion structure, and the protrusion structure is extended from the first main body, wherein the second guiding part is an accommodation structure, and the accommodation structure is formed in the second main body, wherein when the first connector and the second connector are connected with each other, the protrusion structure is accommodated within the accommodation structure.

11. The connector assembly according to claim 6, wherein the first connecting terminal, the second connecting terminal, the third connecting terminal and the fourth connecting terminal are power contacts or signal contacts, wherein low voltage power is transferred through the power contacts, and electrical signals are transferred through the signal contacts.

* * * * *